United States Patent [19]

Reeves

[11] Patent Number: 4,480,698
[45] Date of Patent: Nov. 6, 1984

[54] NICKEL-COATED ALUMINUM RACING HORSESHOE

[75] Inventor: Dennis J. Reeves, Toledo, Ohio
[73] Assignee: Farley Metals, Inc., Toledo, Ohio
[21] Appl. No.: 490,855
[22] Filed: May 2, 1983
[51] Int. Cl.³ .............................................. A01L 1/02
[52] U.S. Cl. .......................................... 168/4; 168/24
[58] Field of Search ............... 168/4, 23, 24; 427/305; 148/6.27

[56] References Cited

U.S. PATENT DOCUMENTS

| | | |
|---|---|---|
| 507,272 | 10/1893 | Jerome . |
| 514,753 | 2/1894 | Jerome . |
| 530,643 | 12/1894 | Kent . |
| 570,278 | 10/1896 | Dellinger ............................... 168/24 |
| 2,622,685 | 12/1952 | Dixon ..................................... 168/13 |
| 3,425,876 | 2/1969 | Steinbrecher ....................... 148/6.27 |
| 3,573,997 | 4/1971 | Plaxton ............................... 148/6.27 |
| 3,578,087 | 5/1971 | Kirkpatrick ............................ 168/24 |
| 3,667,991 | 6/1972 | Miller ............................... 148/6.15 R |
| 3,794,120 | 2/1974 | Charlson ............................... 168/24 |
| 3,907,036 | 9/1975 | Capone .................................. 168/26 |
| 4,091,871 | 5/1978 | Chiaramonte et al. ................. 168/4 |
| 4,215,750 | 8/1980 | Fields et al. ............................. 168/4 |
| 4,299,288 | 11/1981 | Peacock ................................. 168/24 |
| 4,391,652 | 7/1983 | Das et al. ........................ 148/6.15 R |
| 4,400,415 | 8/1983 | Kessler et al. ....................... 427/305 |

Primary Examiner—Robert P. Swiatek
Attorney, Agent, or Firm—Hugh Adam Kirk

[57] ABSTRACT

The disclosure concerns a formable cast aluminum alloy horseshoe having an electroless ductile metal coating having a hardness greater than that of the aluminum alloy, such as a coating of phosphorus nickel. This coating increases the wearable life of the aluminum horseshoe for quarter horse racing horses from a few days to almost a month, and its formability without cracking of the coating permits better fitting to varying sizes of hoofs.

15 Claims, 3 Drawing Figures

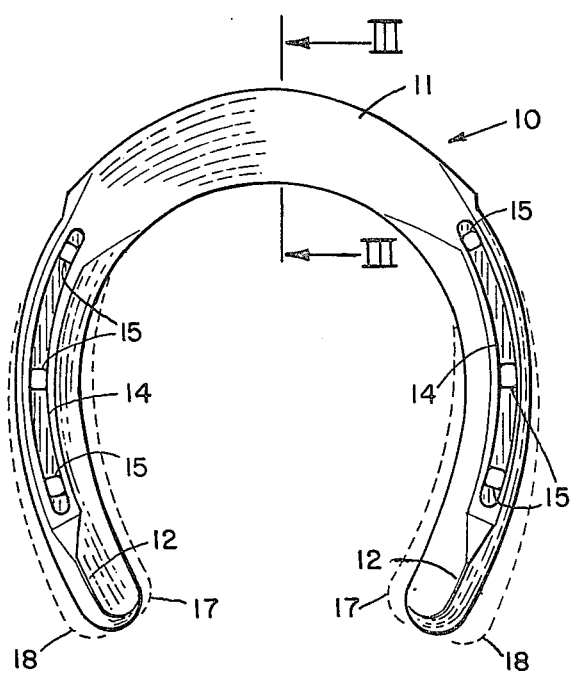
Fig. I
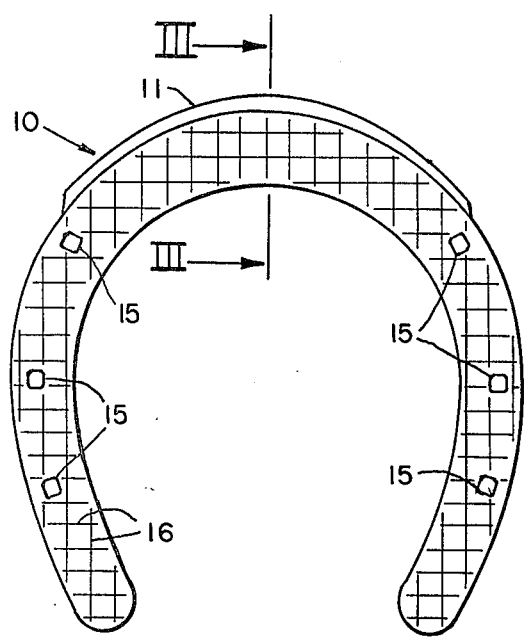
Fig. II
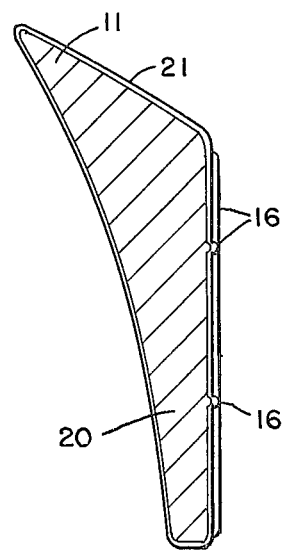
Fig. III

NICKEL-COATED ALUMINUM RACING HORSESHOE

BACKGROUND OF THE INVENTION

Lightweight horseshoes have been known for a long time, but since most lightweight materials are not very hard and/or do not have good wear resistant properties, such as magnesium and aluminum and many plastic materials, such materials have been reinforced with inserts of harder materials, such as steel or by chromium plating. Furthermore, lightweight hard materials such as titanium and chromium plating of aluminum which requires an under electroplating coating of copper, are expensive.

SUMMARY OF THE INVENTION

The aluminum alloy horseshoes of this invention are preferably die cast from a molten aluminum alloy, which cast alloy product can be bent or formed between about 5 and 10% of its original shape without cracking or breaking. These horseshoes also are designed to be as free as possible from sharp corners which form stress zones. These horseshoes are then electrolessly coated with a metal harder than that of their base aluminum alloy, such as coated with nickel or a related metal like iron or cobalt, but preferably a nickel phosphorus or a nickel boron compound by immersion in an autoatalytic ionized metal solution for a sufficient period of time to build up such a hard metal coating of between about 0.0005 and 0.005 inches in thickness, and preferably about one-thousandth of an inch thick.

It was found that such electroless nickel-coated aluminum alloy horseshoes had a Rockwell hardness of between about 40 and 45 on the "C" Scale (using a diamond point), while the Rockwell hardness of the uncoated die cast aluminum alloy horseshoes was between 55 and 60 on an "E" Scale (using an eighth inch steel ball). This increase in hardness of the relatively light aluminum alloy horseshoes permits them to resist wear sufficiently so that they do not have to be changed every three or four days as aluminum uncoated horseshoes had to be, but instead will resist wear so that they only have to be changed after three or four weeks, and thus the horse's hoofs have time to grow sufficiently to provide new tissue for the horseshoe nails for the replacing horseshoes.

Also it has been found that about 80% of the quarter horse racing horses fit #4 size horseshoes and the other 20% fit #3 or #5 sizes. Thus, with the formability of the nickel coated aluminum alloy horseshoes of this invention, at least the adjacent half-sizes, i.e. #3½ and #4½, can be formed from #4 size horseshoes without cracking the coating of the electroless nickel.

OBJECTS AND ADVANTAGES

Accordingly, it is an object of this invention to produce simple, efficient, economic, durable, lightweight, formable, and relatively universal horseshoes for race horses.

BRIEF DESCRIPTION OF THE VIEWS

The above mentioned and other features, objects and advantages and a manner of attaining them are described more specifically below by reference to an embodiment of this invention shown in the accompanying drawings, wherein:

FIG. I is a plan view of the under side of a horseshoe according to the preferred embodiment of this invention showing in dotted lines how it can be bent to fit different size horses hoofs;

FIG. II is a plan view of the opposite side of the horseshoe shown in FIG. I showing intersecting ribs for increasing the friction between the shoe and the horse's hoof; and FIG. III is an enlarged sectional view taken along lines III—III of FIGS. I and II showing the coating on the shoe and the ribs on its flat hoof-engaging side or surface.

DETAILED DESCRIPTION OF PREFERRED EMBODIMENT

Referring to the figures, there is disclosed an electroless nickel-plated aluminum alloy horseshoe 10 of general U-shaped configuration in which the base portion of the "U" is tapered to form a wedge-shaped toe portion 11 (see also FIG. III) and at the outer ends of the legs raised portions 12 so that the forward edges of these three portions shown in FIG. I will be substantially in the same plane and the horse's hoof will rest parallel to the ground. Intermediate the raised portions 11 and 12 on the two legs of the U-shaped horseshoe are two arcuate grooved portions 14, each of which contains three rounded corner nail holes 15 of rectangular cross-section, through which holes 15 nails extend to anchor the horseshoes to the bottom of a horse's hoofs. There is also shown in FIGS. II and III orthogonal ribs 16 on the flat surface of the shoe which rests against the bottom of the horse's hoof, which ribs 16 aid in increasing the sliding friction between the horseshoes and the hoofs.

Since the aluminum alloy 20 of which the horseshoe is die cast has a composition which permits it to be formable by at least 5% and preferably less than 10%, it can be bent into the dotted line position 17 and 18 shown in FIG. I to fit more accurately different size hoofs without breaking or cracking the alloy base or its harder metal coating 21, shown thereon in FIG. III. Such a die cast aluminum alloy 20 composition preferably contains between about 4½ and 6% by weight silicon, less than 0.8% by weight iron, less than 0.6% by weight copper, and less than 0.5% by weight magnesium.

After this molten aluminum alloy has been die cast in a mold to form a horseshoe as shown in FIGS. I and II, the flash is removed and the aluminum alloy horseshoe is degreased, if necessary, and prepared for its electroless metal coating by being, for example: soaked in an alkali solution for five minutes; rinsed with cold water; soaked again in an alkali solution at 160° F. for a half hour; cold rinsed with water a second time; dipped into an acid, such as nitric or sulfuric acid, for ten to fifteen seconds to neutralize any remaining alkali; rinsed again with water; immersed into a zinc coating bath at room temperature for about twenty seconds; rinsed twice again with cold water; and finally immersed into the autocatalytic coating solution preferably containing nickel ions and sodium hypophosphite for depositing the nickel and some phosphorus onto the aluminum alloy horseshoes, for between 1½ and 5 or 6 hours, depending upon the thickness of the coating from 0.0005 of an inch up to ten times that, namely 0.005 of an inch, respectively. Preferably a coating of about one-thousandth of an inch is employed, which takes approximately about three and a quarter hours in the electroless coating solution or bath.

The phosphorus content of the coating varies between about 2 and 12% by weight and it has been found that the less the content of the phosphorus, the coarser the grains of nickel in the coating 21 which makes the coating more ductile and less likely to crack when the base aluminum alloy is bent between 5 and 10% as shown in the dotted line position 17 and 18 in FIG. I. Also, if desired, instead of an electroless coating of nickel with phosphorus, a coating of an electroless nickel with boron may be used; however, such a nickel boron coating is more expensive than the nickel phosphorus coating, and it does not give any better or more satisfactory coating than the nickel phosphorus coating preferred herein.

Although other metals and alloys than the aluminum alloy described above, such as alloys of magnesium, may be employed and be coated with an electroless metal such as nickel, it has been found that nickel has the best properties and the most economical of other known electroless metal coatings. However, other chemical processes than the one described above may be employed for autocatalytically depositing the coating 21 on the alloy 20 without departing from the scope of this invention.

While there is described above the principles of this invention in connection with specific apparatus, it is to be clearly understood that this description is made only by way of example and not as a limitation to the scope of this invention.

I claim:

1. A cast aluminum alloy horseshoe having an electroless coating of metal having a hardness greater than that of the aluminum alloy and a thickness between about 0.0005 and 0.005 inches, said alloy with said coating being bendable between about 5% and 10% of its original shape without fracturing.

2. A horseshoe according to claim 1 wherein the thickness of said coating is about one-thousandth of an inch.

3. A horseshoe according to claim 1 wherein said coating metal is nickel.

4. A horseshoe according to claim 3 wherein said nickel coating contains less than about 12% by weight phosphorus.

5. A horseshoe according to claim 1 having a flat side for engagement with the bottom of the hoof of a horse, which flat side contains friction-producing ribs.

6. A horseshoe according to claim 1 for quarter horse racing horses.

7. A horseshoe according to claim 6 having a size #4.

8. A horseshoe according to claim 1 wherein said coating has a Rockwell hardness of between about 40 and 45 on the "C" Scale.

9. A cast aluminum alloy horseshoe having a nickel coating having a thickness between about 0.0005 and 0.005 inches, said alloy with said coating being bendable between about 5% and 10% of its original shape without fracturing.

10. A horseshoe according to claim 9 wherein the thickness of said coating is about one-thousandth of an inch.

11. A horseshoe according to claim 9 wherein said nickel coating contains less than about 12% by weight phosphorus.

12. A horseshoe according to claim 9 having a flat side for engagement with the bottom of the hoof of a horse, which flat side contains friction-producing ribs.

13. A horseshoe according to claim 9 for quarter horse racing horses.

14. A horseshoe according to claim 13 having a size #4.

15. A horseshoe according to claim 9 wherein said coating has a Rockwell hardness of between about 40 and 45 on the "C" Scale.

* * * * *